United States Patent
Løvheim et al.

(10) Patent No.: US 10,578,761 B2
(45) Date of Patent: Mar. 3, 2020

(54) SYSTEM AND METHOD FOR OPERATING A SUBSEA SENSOR FIELD

(71) Applicant: OCTIO AS, Bergen (NO)

(72) Inventors: Leon Løvheim, Bergen (NO); Bjarte Fagerås, Fana (NO); Magne Oldervoll, Os (NO); Helge Brandsaeter, Hamresanden (NO)

(73) Assignee: OCTIO AS, Bergen (NO)

( * ) Notice: Subject to any disclaimer, the term of this patent is extended or adjusted under 35 U.S.C. 154(b) by 0 days.

(21) Appl. No.: 16/220,178

(22) Filed: Dec. 14, 2018

(65) Prior Publication Data

US 2019/0120989 A1 Apr. 25, 2019

Related U.S. Application Data

(63) Continuation of application No. 15/546,456, filed as application No. PCT/NO2016/050010 on Jan. 26, 2016, now Pat. No. 10,191,172.

(30) Foreign Application Priority Data

Jan. 29, 2015 (NO) .................................. 20150132

(51) Int. Cl.
| | | |
|---|---|---|
| *G01V 1/38* | (2006.01) | |
| *B63G 8/00* | (2006.01) | |
| *B63C 11/52* | (2006.01) | |
| *G01V 1/20* | (2006.01) | |

(52) U.S. Cl.
CPC ............ *G01V 1/3852* (2013.01); *B63C 11/52* (2013.01); *B63G 8/001* (2013.01); *G01V 1/202* (2013.01); *G01V 1/3843* (2013.01); *B63G 2008/007* (2013.01); *B63G 2008/008* (2013.01)

(58) Field of Classification Search
CPC combination set(s) only.
See application file for complete search history.

(56) References Cited

U.S. PATENT DOCUMENTS

| | | |
|---|---|---|
| 6,223,675 B1 | 5/2001 | Watt |
| 6,808,021 B2 | 10/2004 | Zimmerman |
| 8,675,446 B2 | 3/2014 | Gatemen |
| 2005/0098377 A1 | 5/2005 | Bary |
| 2009/0238647 A1 | 9/2009 | Delfino |
| 2014/0301161 A1 | 10/2014 | Brizard |
| 2015/0331126 A1* | 11/2015 | Lambert .............. G01V 1/3808 367/15 |
| 2016/0121983 A1 | 5/2016 | Rokkan |

OTHER PUBLICATIONS

International Search Report issued in PCT/NO2016/050010 dated Apr. 25, 2016, pp. 1-3.
Written Opinion issued in PCT/NO2016/050010 dated Jan. 21, 2016, pp. 1-8.
Norwegian Search Report issued in Norwegian patent application No. 20150123, dated Jun. 26, 2015, pp. 1-5.

* cited by examiner

*Primary Examiner* — Sean D Andrish
(74) *Attorney, Agent, or Firm* — Jeffrey S. Melcher; Melcher Patent Law PLLC

(57) ABSTRACT

A system (1) for operating a subsea sensor field (2), comprises an automated underwater vehicle—AUV (10) and a subsea service station (13). A sensor (11, 12) in the sensor field (2) comprises a permanently installed base unit (11) and a removable control unit (12). The AUV (10) moves control units (12) to the service station (13) for charging and updating, and then back to the base units.

8 Claims, 2 Drawing Sheets

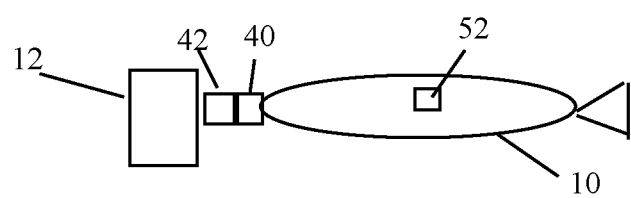
FIG. 2
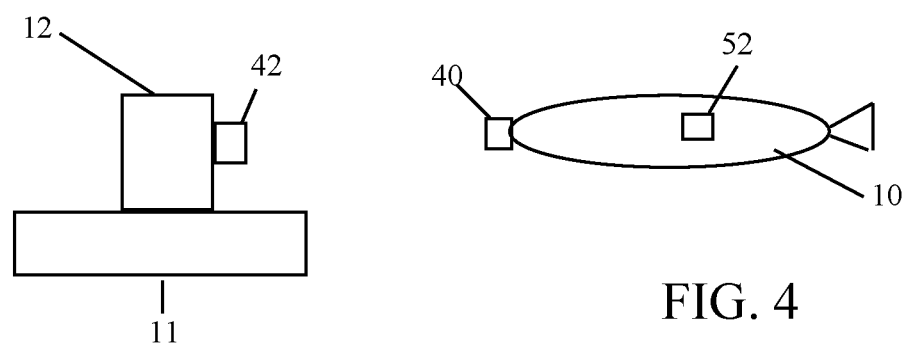
FIG. 3
FIG. 4

SYSTEM AND METHOD FOR OPERATING A SUBSEA SENSOR FIELD

BACKGROUND

Field of the Invention

The present invention concerns a system and method for operating a subsea sensor field, i.e. an array of sensors and sources for monitoring a region of interest.

Prior and Related Art

Subsea reservoirs or geological structures may be monitored using different time-lapse techniques, each having its advantages and disadvantages. A first type of technique involves repeated marine seismic surveys with various types of surface-towed seismic equipment, i.e. powerful acoustic sources and associated seismic streamers. The main advantage of these techniques is an ability to monitor or survey large areas relatively fast. A disadvantage is that the collected data include P-waves (primary pressure waves) only, as S-waves (secondary shear waves) from a subterranean structure do not propagate through the water column to the hydrophones in the streamers.

A second technique involves repeated marine seismic surveys with re-deployable ocean bottom sensors (wired or autonomous) with towed seismic sources. In these techniques, geophones on the seafloor collect additional data from the S-waves. In some varieties, ocean bottom cables are retrieved at one edge of a large array and redeployed at an opposite edge while a survey is conducted in the middle of the array using seismic sources. Such methods require one or more cable handling vessels, a source vessel and a large number of sensors. Alternatively, one vessel can move the entire seafloor array between surveys, thereby reducing speed but also expenses.

A third technique involves repeated marine seismic surveys with permanently installed ocean bottom sensors (typically wired) with towed seismic sources. Such methods are suitable for monitoring a fixed structure, e.g. a reservoir or a structure around an installation, as every sensor is located at the same spot in subsequent surveys. The seismic sources may still be towed by a source vessel. However, such vessels typically must be hired a long time in advance, and their cost of operation is relatively high. Both factors tend to increase the periods between surveys. Other disadvantages are problems associated with towing and releasing powerful acoustic sources near an installation, adverse effects on marine life, etc. Seismic sources on the seafloor have been proposed to reduce these problems.

Other techniques known in the art use electromagnetic radiation (EM) instead of acoustic signals, and otherwise resemble the acoustic techniques discussed above. Gravimetric techniques measure local variations in gravitation to determine changes in the underground. Still other techniques use accurate inclinometers to measure changes in the inclination at different points above a geological structure in order to record changes. Any suitable sensor and/or source can be used with the present invention. For example, some of the devices above are based on accelerometers, in particular MEMS (micro electromechanical systems)-accelerometers. Any other instruments or devices, e.g. seismometers, based on accelerometers can be used with the invention. Furthermore, non-seismic sources and sensors, e.g. echo-sounders, as well as sensors for monitoring environmental parameters of any kind are anticipated.

In this description and the claims, the term 'sensor field' denotes a collection of any kind of sensor and/or source as briefly described above. The sensor field is deployed at a seafloor, and monitors a region of interest, i.e. a geological structure below the sensor field and/or a body of water above the sensor field as well as the seafloor on which it is deployed. Regardless of type, the sensors and/or sources in the sensor field may be connected in a network for communication and/or power supply. Alternatively, the sensors and sources can be connected directly to the surface, or be contained in autonomous units with an associated battery unit, a storage unit etc. as known in the art. The term 'wired network' as used herein, means a conventional network of metallic wires and/or fibres for power and/or communication. Thus, a subsea communications network based on, for example, acoustic links as known in the art is a network, but not a wired network.

In general, a system for operating such a subsea sensor field requires means for deploying and retrieving components, providing power, downloading instructions, uploading data, calibrating sensors etc. As indicated, the actual functions of the operating system depend on the application at hand. For example, electric power could be supplied through a wired network or from a battery unit, the system could depend on a source towed behind a surface vessel, etc.

In the following description and claims, a distinction is made between 'autonomous' and 'automated'. An 'autonomous device' contains its own power supply and control system. Hence, an autonomous device does not require power supply or communication lines to the surface, whereas external power and communication lines are optional for an 'automated device'. In particular, the term AUV as used herein means 'automated underwater vehicle', and include conventional remotely operated vehicles (ROVs) and movable subsea platforms in addition to autonomous underwater vehicles.

The term 'control system' as used herein includes any system comprising a sensor, a controller and an actuator wherein the controller issues commands to the actuator depending on input from the sensor and a control algorithm. That is, 'control system' as used herein includes, but is not limited to, a system implementing a cybernetic loop. For example, a system issuing a storage command to a storage device in an autonomous sensor node is a control system according to the present definition.

As known in the art, deploying components on the seafloor with an ROV is time consuming and/or inaccurate. This is a disadvantage in time-lapse monitoring, where the sensors should preferably be located at the same spot before and after retrieval and redeployment.

Control algorithms for storage and retrieval at predefined positions are generally known, and implemented in, for example, robotic systems storing and retrieving goods in a warehouse. These control algorithms can obviously be adapted to deploy and retrieve nodes at predefined positions on the seafloor, and are not further described herein. However, there are no rails or other guides in a sensor field at the seafloor, so an autonomous underwater vehicle would either need a post-installed guidance system, or depend on inertial navigation, in particular output from MEMS-accelerometers as known in the art.

The objective of the present invention is to provide system for operating a sensor field solving at least one of the problems from prior art while retaining the benefits.

SUMMARY OF THE INVENTION

Objectives of the present invention can be achieved by a system for operating a subsea sensor field for monitoring a field of interest, comprising:

an automated underwater vehicle (AUV);
a sub sea service station; and
a sensor field comprising a plurality of sensors configured for monitoring a region of interest, wherein at least one sensor in the sensor field comprises a permanently installed base unit and a removable control unit, the AUV comprises a first transport connector and the removable control unit comprises a second transport connector, and the service station comprises a docking connector configured for receiving the control unit, and wherein the AUV is configured to autonomously connect and disconnect the first transport connector to the second transport connector and move the removable control unit between the permanently installed base unit and the docking connector on the service station.

In a first aspect, the invention concerns a system for operating a subsea sensor field, comprising an AUV and a subsea service station. At least one sensor in the sensor field comprises a permanently installed base unit and a removable control unit. The AUV and control unit are provided with complementary transport connectors and the service station is provided with a docking connector for receiving the control unit.

The control unit may contain its own power supply, i.e. a battery unit, storage for data etc., and be self-contained for a period of time until the AUV brings it to the service station for charging and updating. The updating may include uploading sensor data, calibration, synchronization of internal clocks, downloading instructions, software or firmware updates etc., and is performed at regular intervals or when required. Thus, the control unit does not require power lines or communication lines. As the base unit remains at the seafloor, the control unit returns to the exact same spot as before, so no accuracy is lost e.g. in a 4D-operation. In some applications, the base unit contains heavy elements, e.g. a mass for generating low frequency signals for a seismic survey. In these applications, there is limited need for inflatable buoyancy elements and no need for a powerful AUV as only the control unit moves to and from the service station. This reduces the complexity of operation, the requirements for the AUV and saves energy.

The service station may be connected to the surface through an umbilical. In line with common usage, the umbilical is assumed to be a shielded cable containing power lines, communication lines etc. such that the operations at a subsea service station may be controlled from the surface. Thus, the alternative to an umbilical would be retrieving the control unit to a service station at the surface. The most cost effective alternative depends on the application.

The system preferably comprises a docking station for the AUV. This may be deployed at the seafloor to eliminate or reduce the need for retrieving the AUV to the surface as would be the case for a typical ROV. Alternatively, the docking station can, for example, be part of a cradle for an ROV at an operation deck of a surface vessel. Either way, the docking station is of a standard type used for recharging and testing the AUV at the surface or at the seafloor. In general, the docking station for the AUV may be associated with the service station for control units, or the docking station and service station may be different devices at different locations.

In some embodiments, the base unit is connected to a wired network. The wired network may be part of a permanent array on the seafloor, e.g. for monitoring a reservoir, and provide power and/or communication to some or all components on the seafloor. For example, a seismic source with a removable control unit may be provided with power and communication from a permanent network originally installed for providing power and communication to an array of permanent sensors.

The wired network may be connected to the service station. Thus, one central installation, preferably on the seafloor, comprise all connectors, subsea controllers etc. for the control units and the AUV.

In a preferred embodiment, the AUV comprises a control system and a set of base units comprise a corresponding guidance system, such that the AUV can operate without communication to the surface except through the docking station. The set of base units provide a set of fixed locations suitable for a position system, e.g. one based on acoustic waves or radio waves. In many instances, a commercially available acoustic positioning system would be suitable. However, any alternative known in the art may be considered, for example a visual beacon, an acoustic beacon or a guidance system based on a Hall-sensor tracking a conducting wire. Either way, navigation and localisation of a base unit is faster and more accurate using such a guidance system than by using inertial navigation means only. The AUV can obviously contain a battery unit, and instructions, including software and firmware updates, can be provided through the docking station. Thus, the AUV can be operated without separate power lines and communication lines, and without a dedicated operator steering the AUV by remote control. In general, a guidance system facilitates autonomous operation of the AUV, thereby eliminating the need for a communication link from the AUV to the surface and reducing the need for a dedicated human operator at the surface.

In a second aspect, the invention concerns a method for operating a subsea sensor field, comprising the steps of: deploying a system as described above; connecting a control unit to a base unit by means of the AUV; operating the control unit at the base unit for a predetermined period of time and moving the control unit to the service station by means of the AUV.

The step of moving the control unit to the service station by means of the AUV may be performed at regular intervals. This way, the AUV may collect several control units and bring them to or from the service station in one trip. Alternatively, the AUV may collect one or more control units one by one when an event occurs, e.g. when a first battery in a set of similar batteries is depleted, or for synchronising a set of control units when it is decided to perform a series of measurements. The step of operating the control unit includes collecting data if the combined control/base unit comprises a sensor, and timing etc. if the combined control/base unit comprises a source.

In some embodiments, one control unit may be connected to several base units sequentially. This may be useful if the control unit comprise particularly expensive and/or accurate instruments. For example, an accurate and expensive gravimeter brought from base unit to base unit may provide better data than several less accurate and less expensive permanent gravimeters. It is also appreciated that interchanging similar control units may be useful during troubleshooting, or in order to average data from one location by measuring data at the location of the base station with a series of different control units.

The step of moving the control unit may include collecting several control units before moving to the service station. This corresponds to the embodiments of the system in which the control units are charged and/or updated on a regular basis and/or when a particular event occurs.

Further features or benefits will appear from the dependent claims and/or the detailed description below.

BRIEF DESCRIPTION OF THE DRAWINGS

The invention will be described in greater detail by means of example with reference to the accompanying drawings, in which.

DETAILED DESCRIPTION OF A PREFERRED EMBODIMENT

Figure 1:
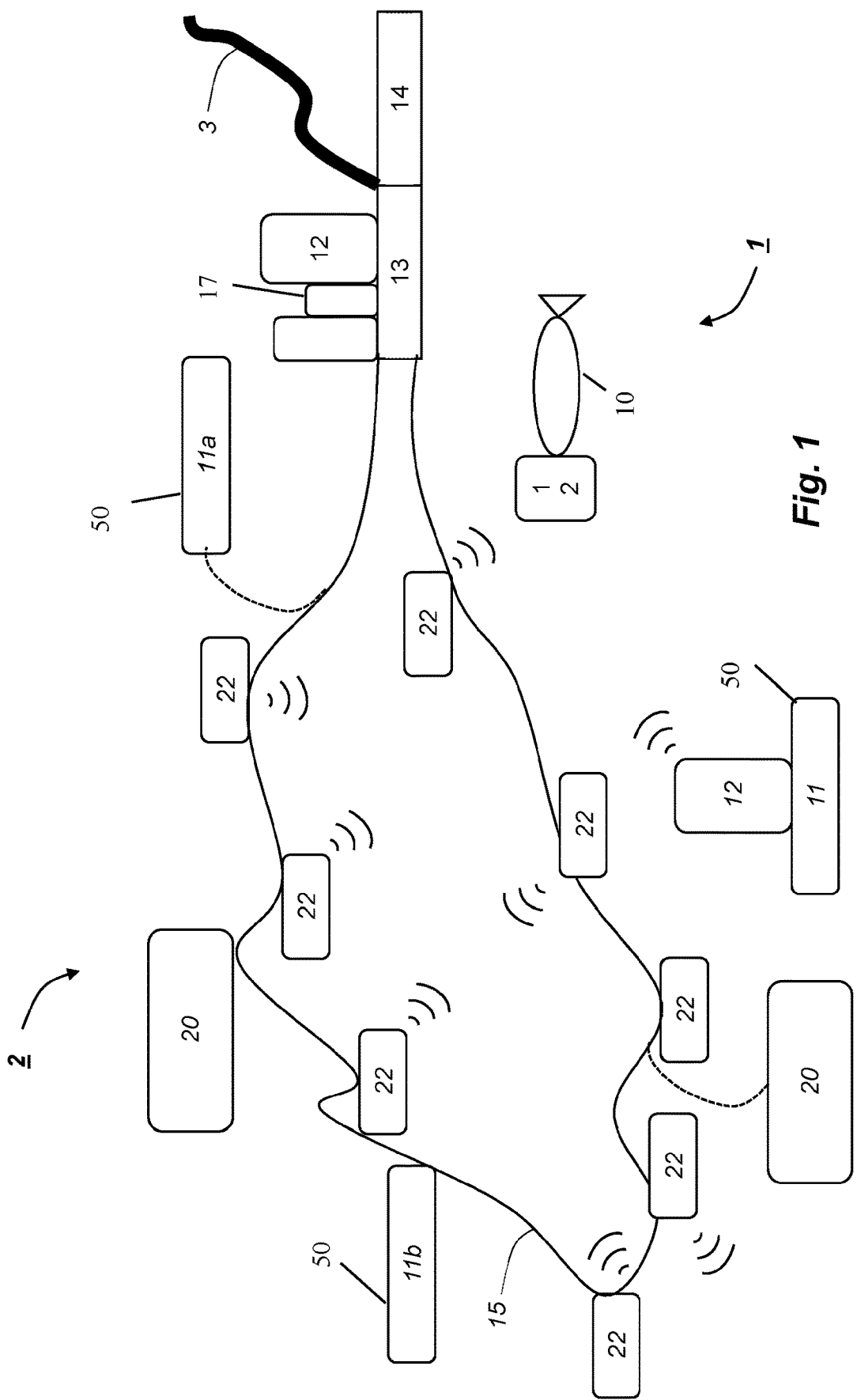
FIG. 1 illustrates a system according to the invention for operating a sensor field.

FIG. 1 illustrates a sensor field 2 deployed on a seafloor, i.e. under a body of water. The sensor field 2 has permanent sources 20 and sensors 22 of various kinds as described in the introduction. The permanent sources 20 and sensors 22 are connected to a wired network 15, which provides electric power and/or communication links. The sensor field 2 could be designed differently than shown in FIG. 1, for example as a rectangular grid of synthetic ropes with an autonomous node at each intersection. The grid could be made of synthetic rope or steel wire for maintaining predetermined distances. Thus, a grid does not imply power supply or communication, but power and/or communication can be provided through a grid.

FIG. 2 illustrates the AUV 10 connected to the control unit 12 using the first transport connector 40 and the second transport connector 42.

FIG. 3 illustrates the control unit 12 connected to the base unit 11 and having a second transport connector 42.

FIG. 4 illustrates an AUV 10 having a first transport connector 40 and a control system 52.

The sensor field 2 is operated by a system 1 comprising an AUV 10, base units 11, 11a, 11b, control units 12, a service station 13 for the control units 12 and a docking station 14 for the AUV 10. The AUV 10 has a first transport connector 40 and the control unit 12 has a second transport connector 42. The transport connectors 40, 42 are used by the AUV 10 to transport the control unit 12 to the service station 13. The service station 13 has a docking connector 17 for connecting the service station 13 to the control unit 12.

When connected, a base unit 11 and a control unit 12 correspond to permanent source 20, which can be a fully operable generic source unit, or sensor unit 22 as described above. That is, one combination of base unit 11 and control unit 12 can be an acoustic source, and another combination can be a gravimetric sensor device.

The base units 11, 11a, 11b remain on the seafloor while the AUV 10 carries their respective control units 12 to the service station 13 for charging and updating and back to the base units several times. Here, the term 'updating' includes any operation involving communication to the surface, e.g. uploading any measurement data, calibration, synchronisation of internal clocks, downloading instructions including any software and firmware updates, etc.

As a first example, assume that the base unit 11 and its associated control unit 12 represent an acoustic source. In this example, the base unit 11 contains heavy parts, e.g. a large mass used to provide low frequency acoustic signals and a motor to move the mass. Prior to a series of measurements, the associated control unit 12 is brought to the service station 13, where its batteries are charged and an internal clock is synchronized to sensor clocks in the sensor field 2. Then, the AUV 10 carries the control unit 12 back to the base unit 11, where the control unit 12 is reconnected to its base unit 11 to form a complete acoustic source. In this example, the power consumption is reduced as the large mass is not moved by the AUV 10. Further, the accuracy of measurement is increased as the base unit 11 remains in place during charging and updating of the control unit 12. Last, but not least, the ability to synchronise an internal clock shortly before activating the source for a series of measurements enables the use of an inexpensive timer in a fully autonomous source without sacrificing accuracy.

In a second example, base unit 11a is adapted to receive a sensitive and accurate gravimetric instrument within a control unit 12. The associated control unit 12 is temporarily removed, e.g. for charging, updating or protection from powerful acoustic pulses from a seismic source. As the base unit 11a is functionally different from the base unit 11 in the previous example, the connectors to the respective control units 12 are functionally different. For example, there is a need for a high power connection to the motor in the previous example, but no need for a similar power connection in a gravimetric instrument. However, transport connectors 40, 42 for connecting the control units 12 to the AUV 10 during transport to and from the service station 13 are similar or identical.

For example, there is a need for a high power connection to the motor in the previous example, but no need for a similar power connection in a gravimetric instrument. However, transport connectors for connecting the control units 12 to the AUV 10 during transport to and from the service station 13 are similar or identical.

Base unit 11b is connected to a wired network 15 providing power and/or communication to the sensor field 2. Thus, power and/or communication to a combination of a base unit 11b and a control unit 12 may be provided through the network 15. For example, a firing signal for a source associated with base unit 11b may coincide with firing signals to the permanent sources 20. Alternatively or additionally, the base unit 11b may comprise a power source charged from the network 15 such that the associated control unit 12 only uses the service station 13 for updating.

The service station 13 accommodate control units 12 of different shapes, sizes and configurations, as the control units 12 belong to different sources and sensors. More precisely, the service station 13 comprises different bays, each with physical dimensions and connectors adapted to one or more control units 12. A small control unit 12 can be received in a bay accepting larger control units 12, provided the physical and electrical properties of the connectors are compatible.

The docking station 14 is adapted to the AUV 10, and several combinations of an AUV 10 and an associated (subsea) docking station 14 are commercially available. The docking station 14 essentially provide the same services for the AUV 10 as the service station 13 provides for the control units 12, in particular charging, updating and providing operating instructions. The service station 13 and the docking station 14 are independent of each other, and may be deployed at different locations subsea or at the surface.

An umbilical 3 connected to the service station 13 and/or the docking station 14 provides power and communication lines to the surface. The umbilical is of a type known in the art, and is not further described herein.

Preferably, the umbilical 3 connected to the service station 13 comprises power lines and communication lines already provided for the sensor field 2 and/or the network 15. In some instances, the service station 13 may thus be connected to one or more auxiliary outputs in a central unit already provided for the permanent sensor field 2. The docking station 14 for AUV 10 can be connected in a similar manner, or be provided with separate power supply and communication lines from the surface.

During operation of the sensor field 2, the AUV 10 can bring a control unit 12 to the service station 13 when the control unit 12 needs charging, prior to a survey etc., i.e. based on an event. Preferably, such an event-based handling is combined with a regular maintenance schedule. For example, several control units 12 can have similar batteries so that when one battery is depleted, other batteries are likely to be depleted shortly thereafter. In this case, it might be efficient to collect and charge several batteries in one trip with the AUV 10. It is also possible to schedule certain tasks at regular intervals, for example synchronising all clocks in a set of control units once a week. In general, the scheduled and event based modes of operation are independent of each other, so one operational mode does not exclude the other.

The AUV 10 can be a traditional ROV with a light source, a camera and a tether comprising power lines and communication lines to the surface. In terms of the generic control system briefly discussed in the introduction, the camera is a sensor providing visual images, the controller is a human operator, and the actuator is one or more thrusters on the ROV. In this system, a base unit with a visual beacon, e.g. a solid state light emitting device (LED), would make the base unit more visible, especially if the visibility is low at the seafloor. The light beacon is a simple example of a guidance system associated with a generic control system. In a preferred embodiment, the AUV 10 comprises a control system 52 and a set of base units 11, 11a, 11b comprise a corresponding guidance system 50, such that the AUV can operate without communication to the surface except through the docking station.

An autonomous system requires a control system and a guidance system neither of which include communication to the surface. This implies an autonomous AUV, and eliminates the need for a dedicated human operator for steering the AUV from the surface. Of course, a human operator may still monitor logs, handle software updates etc., but the need for human interaction, and hence operational cost, can easily be reduced with an autonomous system.

In many applications, an acoustic positioning system would be suitable as a guidance system. Acoustic positioning systems are available from several vendors, and generally use acoustic sources at fixed locations for positioning and orientation. The acoustic sources for the positioning system can be incorporated in the base units of the present invention, or they can be deployed directly at the seafloor. A generic subsea guidance system could be based on electromagnetic radiation, e.g. visible light or radio. However, the range or visibility can easily be less than the average distance between adjacent base stations.

Alternatively, an autonomous AUV could be provided with a Hall-sensor and a control system capable of following an electric conductor. Such a guidance system can be practical in a sensor field with a pre-existing grid of steel wires. As noted above, steel wires do not imply power supply or communication. A possible drawback of such a guidance system is the need for post-installing a conductive wire, e.g. a thin copper wire, to stand-alone base stations 11 and/or to a sensor field 2 using stand-alone nodes or synthetic ropes to maintain the distance between nodes.

The acoustic sources above have different purposes and widely different properties, e.g. emitted power and frequency range. However, apart from the general term 'acoustic source', a seismic source has little in common with an echo-sounder in a control unit (12) or an acoustic beacon in a base unit (11). The grid of acoustic transducers in an acoustic positioning system is sometimes called an acoustic network. Thus, the term 'acoustic network' does not imply any communication capabilities. However, communication capabilities are not excluded from a generic acoustic network. For example, an acoustic network having its own, separate acoustic transducers may be convenient for communication within the sensor field. Similarly, radio links could be employed to provide a wireless network at the sensor field 2. Thus, some sensors and/or sources in the sensor field 2 can be connected to a wired network, some to a wireless network and some to no communication network.

To summarise, separating a node into a base unit 11 that is stationary at the seafloor and a control unit 12 enables subsequent measurements to be performed at the exact same spot. This increases the accuracy of a repeated measurement, e.g. in time-lapse monitoring. In addition, returning the sensors to their previous location is fast, as finding a base unit 11 is simple compared to finding an exact point using navigation equipment. The AUV 10 is an inexpensive means of transport, especially compared to specialised surface vessels. Thus, the system and method of the invention improve imaging quality and allow shorter intervals between measurements, and still saves operational costs, especially compared to the operational cost of a surface vessel.

The invention claimed is:

1. A system for operating a subsea sensor field for monitoring a region of interest, comprising:
    an automated underwater vehicle (AUV);
    a sub sea service station; and
    a sensor field comprising a plurality of sensors configured for monitoring a region of interest, wherein at least one sensor in the sensor field comprises a permanently installed base unit and a removable control unit, the AUV comprises a first transport connector and the removable control unit comprises a second transport connector, and the service station comprises a docking connector configured for receiving the control unit, and wherein the AUV is configured to autonomously connect and disconnect the first transport connector to the second transport connector and move the removable control unit between the permanently installed base unit and the docking connector on the service station.

2. The system according to claim 1, wherein the service station is connected to a surface through an umbilical.

3. The system according to claim 1, further comprising a docking station for the AUV.

4. The system according to claim 1, wherein the base unit is connected to a wired network.

5. The system according to claim 4, wherein the wired network is connected to the service station.

6. The system according to claim 3, further comprising a plurality of base units, wherein the AUV comprises a control system and a set of base units comprise a corresponding guidance system, such that the AUV is configured to operate without communication to a surface except through the docking station.

7. The system according to claim 1, wherein the region of interest is at least one of a geological structure below the sensor field, a body of water above the sensor field, or the seafloor on which the sensor field is deployed.

8. The system according to claim 1, wherein the control unit comprises at least one of a battery or storage for data, so that the battery can be charged and/or the control unit undated when the control unit is connected the docking connector.

* * * * *